Sept. 28, 1965         C. E. CROUTHAMEL ETAL         3,208,883
                        HYDROGEN-HYDRIDE CELL
                         Filed Aug. 10, 1962
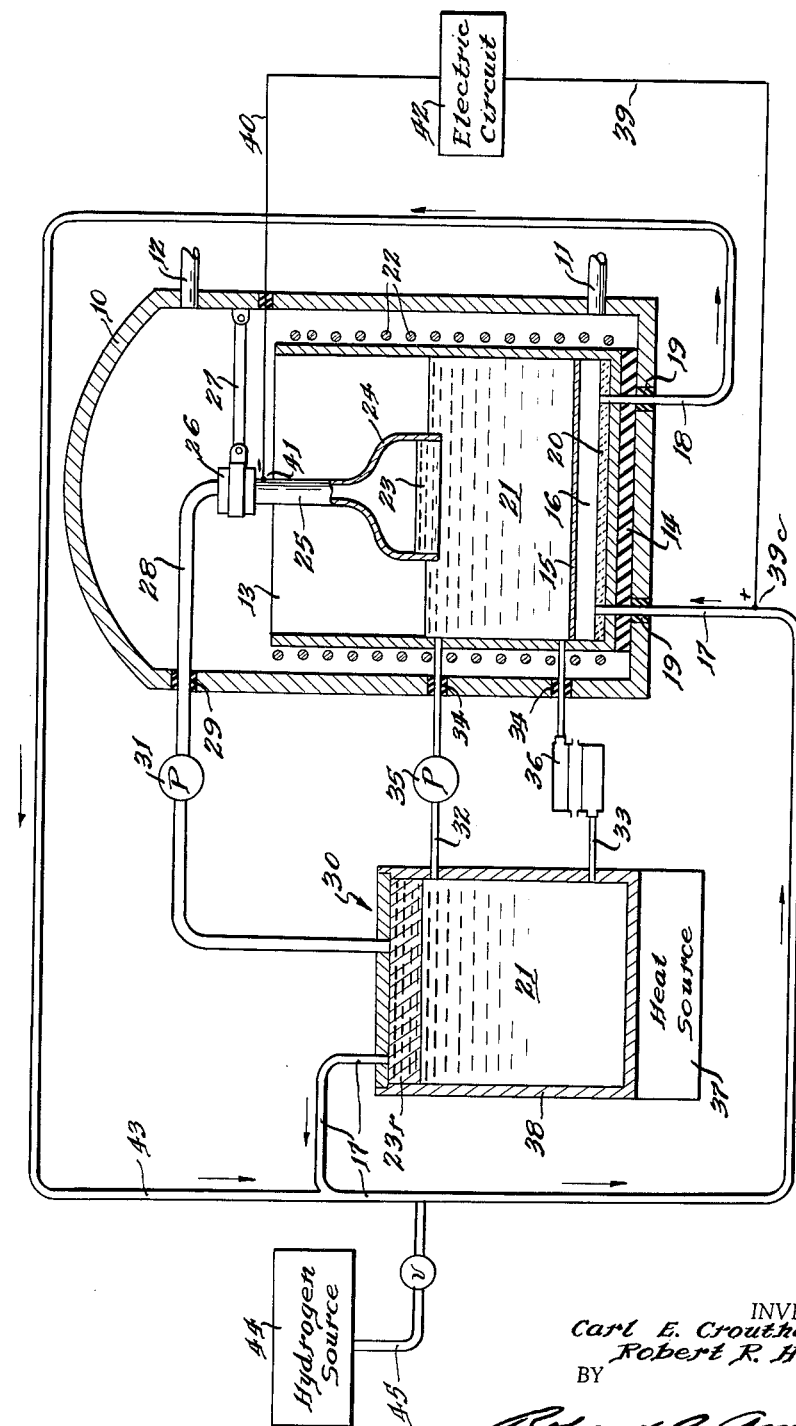
INVENTORS
Carl E. Crouthamel
Robert R. Heinrich
BY
Attorney

United States Patent Office 3,208,883
Patented Sept. 28, 1965

3,208,883
HYDROGEN-HYDRIDE CELL
Carl E. Crouthamel, Glen Ellyn, and Robert R. Heinrich, Downers Grove, Ill., assignors to the United States of America as represented by the United States Atomic Energy Commission
Filed Aug. 10, 1962, Ser. No. 216,712
1 Claim. (Cl. 136—86)

The invention relates to an improved hydrogen-hydride cell, more particularly to such a cell when a part of a continuous heat regenerating system.

Fuel cells of the general hydrogen-hydride type are known, as shown by U.S. Patent No. 3,031,518, and elsewhere. These cells, while theoretically promising, are not economically feasible due to their current output being insufficient to justify their cost in competition with conventional methods of producing electricity. A cell with a lower cost of construction and operation by reason of an iron barrier-electrode is described in the U.S. Patent application of Carl E. Crouthamel and Melvin S. Foster, Serial No. 148,772, filed October 30, 1961, now Patent No. 3,119,723; this cell, while more efficient than those preceding it, still fails to provide the amperage needed for commercial success.

It is, accordingly, the general object of the invention to provide an improved fuel cell of the hydrogen-hydride type.

It is a more particular object to provide an improved fuel cell of the hydrogen-iron barrier-hydride type with an improved output of amperage.

Other objects will appear as the description proceeds.

We have discovered that the operation of hydrogen-hydride cells may be substantially improved by placing an alpha source such as an alpha-emitting isotope or isotope mixture on the hydrogen or gas side of the barrier-electrode, or opposite the hydride, or fused electrolyte, side. This results in an increased amperage output for a cell of given dimensions and other characteristics, and is due to the fact that the output-determining step in the cell operation is the rate of diffusion of hydrogen through the barrier-electrode. This will be explained in more detail later.

Attention is now directed to the drawing, the only figure of which is a partly schematic, partly sectional view of a heat regenerating system utilizing the improved hydrogen-hydride cell.

Reference numeral 10 designates an outer shell with inert gas inlet 11 and outlet 12 for maintaining an inert gas atmosphere within the shell 10.

Within the shell 10 is a galvanic cell vessel 13 which is electrically conductive and rests on insulating disk 14 on the bottom of shell 10. Vessel 13 has a false bottom or barrier-electrode 15 which is electrically conductive and is preferably made of substantially pure iron as will be explained later on. This is also referred to as a diaphragm and is the cathode of the cell.

The volume created by the barrier-electrode 15 within the cell vessel 13 is a hydrogen or oxidizing gas space 16, the apparent contradiction in terms being due to the fact that in the hydrogen-hydride cell hydrogen actually acts as an oxidizing agent as will be explained. Into the gas space 16 hydrogen gas inlet line 17 admits hydrogen gas and outlet line 18 carries it out, thereby maintaining a constant flow of hydrogen throughout the gas space 16 during the operation of the cell and the apparatus. Lines 16 and 17 are electrically conductive and electrically insulated from the shell 10 by lead-in seals 19.

Resting on the bottom of gas space 16 is radioactive disk 20 with two cutout portions over lines 17 and 18 as drawn. It consists essentially of pyrolytic carbon having embedded close to its top surface a mixture of the oxides of the lighter isotopes of uranium, predominantly the oxide of uranium-233. As will be explained later, alpha radiation from these isotopes affects the output determining step of hydrogen diffusion through the barrier-electrode, or diaphragm 15.

Within the cell vessel 13, supported by the barrier-electrode 15 is a fused salt electrolyte 21, preferably the LiCl–KCl eutectic when a lithium anode is used. Electrolyte 21 is kept in a molten condition by coil heater 22 surrounding the vessel 13.

The anode of the cell consists of a pool 23 of molten metal, in this case lithium, which is held in place on top of the fused electrolyte 21 by funnel-shaped anode cap 24 which tapers upward to tube shape 25 where it is gripped by insulator 26, which, in turn, is supported by arm 27 from shell 10.

Within insulator 26 tube shape 25 is joined by molten metal return tube 28 which enters shell 10 through insulating seal 29 and communicates with the electrolyte regenerator shown generally at 30. Intermediate shell 10 and electrolyte regenerator 30 in metal return tube 28 is pump 31.

In similar fashion electrolyte outlet tube 32 and electrolyte inlet tube 33 pass through insulating seals 34 to the regenerator 30, pump 35 being interposed in the outlet line 32 in order to circulate the electrolyte between the cell vessel 13 and the regenerator 30. Heat exchanger 36 in electrolyte inlet line 33 reduces the temperature of the incoming regenerated electrolyte to the operating temperature of the galvanic cell.

Regenerator 30 consists of a heat source shown schematically at 37 since it may be any one of a number of such sources including the circulating coolant from a nuclear reactor, a fossil fuel burner, a solar heater and the like. Adjacent the heat source 37 is regenerator vessel 38 which holds the circulating electrolyte 21 from the cell vessel 13 for a sufficient period to permit the heat from the heat source 37 to decompose the metal hydride, in this case LiH, into hydrogen gas and metal in the metallic state; the latter will rise to the top and form a discrete layer 23r which is drawn by pump 31 through return tube 28 into the anode 23.

Current is drawn from the cell by means of positive lead wire 39 which is electrically connected to the electrically conductive barrier-electrode 15, as through hydrogen inlet line 17 at 39c, and by negative lead wire 40 which is electrically connected to the anode 23 as at 41 on the anode tube 25. These lead to an electric circuit shown schematically at 42.

Hydrogen resulting from the decomposition of the metal hydride within the electrolyte regenerator 30 is led back from the latter by means of hydrogen inlet line 17. Any hydrogen that fails to diffuse through the barrier-electrode 15 is returned through loop 43 from hydrogen outlet line 18 into hydrogen inlet line 17. A supplemental hydrogen source, which is needed to make up the slight loss of hydrogen which occurs in the cycling operation is shown at 44. Supplemental hydrogen line 45 connects hydrogen source 44 with hydrogen inlet line 17.

In carrying out our invention any strongly electropositive metal capable of forming a heat-decomposable hydride may be used as the anode. Included in these are the alkali metals, alkaline earth metals, and lanthanide metals, although the last named are doubtless too expensive for commercial purposes. We prefer the alkali metals, and especially, as already mentioned, lithium.

For an electrolyte many compounds and compound mixtures may be used, the only rigorous requirements being that they do not react in some competitive way with the anode or cathode diaphragm metals or hydrogen, they be stable at the operating temperature of the cell, and that they do not dissolve any of the metals contacted to any extent. The first mentioned requirement rules out aqueous and most polar organic electrolytes and also oxides and hydroxides; the second rules out nitrates, sulfates, carbonates, chlorates and the like which decompose at the temperatures needed. Sulfides, selenides and phosphides are all possibilities, but to be preferred by far are halides, especially chlorides of the alkali and alkaline earth metals. We prefer mixtures of chlorides, especially eutictic mixtures, since these have lower melting points than pure salts. One reason for preferring the LiCl–KCl eutectic for a cell with a lithium anode is its low melting point, which makes it possible to operate the cell at from about 350° C. to 400° C.

It might be added that a certain degree of impurity can be tolerated in the electrolyte. All last traces of water, oxides, and hydroxides need not be rigorously excluded.

Until recently it was believed that the barrier-electrode, or cathode, had to be made of noble metals such as platinum, palladium, silver-palladium and the other members of the fifth and sixth periods of groups VIII and I of the Periodic Table. However, as is set forth in the application Serial No. 148,772 above mentioned, it has been discovered that substantially pure iron serves better than the noble metals, not only for economic reasons, but also because of superior resistance to corrosion by the fused electroylte. Iron does not permit diffusion of hydrogen quite as rapidly as the noble metals, and hence a composite barrier-electrode of noble metal with an iron surface on the electrolyte side represents the ideal combination for the purpose, although it is doubtful whether the improvement in diffusion is sufficient to justify the composite barrier-electrode over one of iron. In any event, for purposes of the present invention the only requirement is a metallic barrier-electrode which may be up to 10 mils thick and still permits diffusion of hydrogen from the gas space into the electrolyte.

The end products of the cell system prior to their being circulated through the regenerator 30 are the positive and negative ions, $M^{+n}$ and $H^-$, where M is a metal and $n$ its valence. The origin of the positive ion from the anode need not be discussed, but that of the negative hydride ion is important for an understanding of the invention. The hydrogen can pass through the metal barrier only in the protonic state, and hence before it does so the molecular hydrogen must undergo two dissociations, first into atomic form, and next into protons and electrons, thus:

$$\tfrac{1}{2} H_2 \rightarrow H \rightarrow H^+ + e$$

Both these dissociations occur simultaneously, or at least quite close together, due to a catalytic effect on the surface of the barrier-electrode, or diaphragm, next to the gas space. The resulting "cloud" of protons and electrons passes through the metal, and on emerging to the opposite surface considerable recombination takes place to the atomic state in this fashion:

$$H^+ + e \rightarrow H$$

However, instead of the usual recombination of atoms to molecules taking place, the metal cathode yields electrons to the atoms, thereby becoming positively charged, while the hydrogen atoms with the electrons taken from the metal, are converted to the negatively charged hydride ions, according to this equation:

$$H + e \rightarrow H^-$$

Our discovery is that one input-determining step is the step represented by the first of the above equations. We have further discovered that alpha radiation is uniquely suitable for the situation since it accelerates the rate-determining step without adversely affecting the other steps, as will now be explained. Ordinarily when it is desirable to hasten any process by means of ionization, gamma radiation is selected because of its great power of penetration, and alpha radiation is ruled out because of its short range and notoriously poor penetrating ability. Here, however, the limitations of alpha radiation have been found to be advantageous; the alpha rays can penetrate the gas space 16 where they interact with diatomic hydrogen molecules and thus ionize them to the bare protonic state. This increases diffusion through the barrier-electrode and consequently increases the amperage output of the cell, which the invention seeks to accomplish.

With this increase of diffusion by the ionizing action of the alpha rays, no corresponding adverse effects take place with regard to the other steps; because of their weak penetrating power the alpha rays are unable to cross the metal diaphragm where their ionizing energy might interfere with the recombination of the protons with the electrons on the opposite surface, nor with the acquisition of the second electrons to form the hydride ion. Though limited in range, alpha radiation nevertheless possesses great energy and this can bring about a large quantity of ionization where it can penetrate, as in the gas space 16. Hence our invention deposits the energy of radiation where it is needed and excludes it where it would do harm.

Our discovery that alpha radiation, rather than some highly penetrating radiation such as gamma radiation, can be used to promote diffusion of hydrogen and to improve the electrical output of the cell has many practical advantages. Alpha sources are comparatively easy to handle, extremely long lived, and cheap. Several such sources are known and available, these being isotopes of the elements of large atomic numbers or mixtures thereof, which are often products or by-products of the mining and nuclear industries. Any isotope of plutonium may be used, as well as of the other transuranium elements such as curium and americium. More practical, however, and hence to be preferred, are the lighter istopes of uranium, especially $U^{233}$, or a mixture of predominantly $U^{233}$ with a lesser amount of $U^{232}$, which is readily available.

In the average case large masses of the pure alpha-emitting isotopes give off too much radiation for the purpose involved in the invention. Hence, for convenience, it is better to put them on a carrier, somewhat like a catalyst carrier, and preferably on the surface to avoid shielding the alpha rays. Alumina, silica, chromia and other similar ceramic materials may be used as a carrier, but our preferred material is pyrolytic carbon. We have secured good results by spreading a mixture of $U^{233}$ and $U^{232}$ nitrates on 10 ml. thick disks of stainless steel and binding with collodion, a gel-like preparation of cellulose nitrate in alcohol and ether; these are placed in a furnace which pyrolyzes the collodion to carbon and the nitrates to corresponding oxides. The pyrolytic carbon thus bonds the alpha-emitting oxides to the surface of the stainless steel disks.

The amount of alpha radiation required varies, of course, with size and output of the cell in question. For a cell having a barrier 4.5 square centimeters in area and a hydrogen flow at the rate of one cubic centimeter per minute the alpha radiation should be at the rate of from about $5 \times 10^8$ to about $5 \times 10^9$ disintegrations per minute (d.p.m.). This is equivalent to about $1.1 \times 10^8$ to about $1.1 \times 10^9$ d.p.m./cm.$^2$

EXAMPLE

In order to compare the rate of hydrogen diffusion through a barrier-electrode activated by an alpha source with the rate without the alpha source, a ten-mil circular, substantially pure, iron diaphragm was placed in a gas-tight holder with means for introducing hydrogen on one side of the diaphragm and means for measuring diffused hydrogen on the other. The area of the diaphragm was 4½ cm.$^2$ and the rate of hydrogen gas flow on the gas side was 1 cm.$^3$/min.

Permeation of hydrogen to the side opposite the gas side was measured at various temperatures with a manometer and calculated as permeation by means of the formula:

$$P = \frac{K}{x} e^{\frac{-E_p}{RT}}$$

where $P$=amount of gas permeating the diaphragm per unit time (STP)
$K$=a constant, which includes the solubility constant of the gas-metal system, the area of the diaphragm, and the difference of the square root of pressures
$x$=thickness of the diaphragm
$T$=degrees Kelvin
$E_p$=activation energy of permeation (cal. g.$^{-1}$ atom$^{-1}$).

The same procedure was repeated with a pyrolytic carbon alpha-emitting disk placed 1 15/16 inches from the gas side of the diaphragm. The alpha emission came from a mixture of the oxides of $U^{233}$ and $U^{232}$, the combined alpha disintegration rate being approximately $5 \times 10^8$ disintegrations per minute.

Table I below shows the results recorded at various temperatures of permeation in CM³./mm. with and without the alpha source:

*Table I*

PERMEATION OF HYDROGEN THROUGH IRON DIAPHRAGM

| T °C. | Without α-Source, P cm.³/min. | With α-Source, P cm.³/min. |
|---|---|---|
| 300 | | 0.04 |
| 350 | | 0.06 |
| 400 | 0.05 | 0.09 |
| 450 | 0.08 | 0.13 |
| 500 | 0.12 | 0.19 |
| 550 | 0.19 | 0.25 |
| 600 | 0.28 | 0.33 |
| 650 | 0.37 | 0.45 |
| 700 | 0.50 | 0.62 |
| 750 | 0.67 | 0.82 |

From the foregoing it is apparent that up to 350° C. the presence of an alpha source makes a cell operable which otherwise would be entirely inoperable due to the complete failure of diffusion. This is particularly fortunate since it enables the cell to operate in the temperature range which is considered to be the best in other repects. At 400° C. the alpha source nearly doubles the rate of diffusion and at higher temperatures improvement in diffusion continues, though it is less pronounced.

It will be understood that this invention is not to be limited to the details given herein, but that it may be modified within the scope of the appended claim.

What is claimed is:

In a fuel cell of the hydrogen-hydride type having a cell vessel, a molten metal anode, a fused salt electrolyte, a gas diffusible iron-surfaced barrier-electrode up to ten mils thick adjacent the bottom of the vessel so as to form a gas space, means for maintaining a flow of hydrogen in the gas space, and means for thermally regenerating the fused salt electrolyte, the improvement consisting of a thin alpha radioactive coating on the bottom of said vessel, said coating comprising an isotope from the group consisting of uranium, plutonium, curium and americium in a homogeneous pyrolytic carbon matrix and said coating emitting from about $1.1 \times 10^8$ to about $1.1 \times 10^9$ disintegrations per minute per square centimeter of area of said barrier-electrode.

References Cited by the Examiner

UNITED STATES PATENTS

| 1,217,738 | 2/17 | Flannery | 136—146 |
| 2,962,123 | 11/60 | Darling | 55—16 |
| 3,019,358 | 1/62 | Ohmart | 136—100 |
| 3,119,723 | 1/64 | Crouthamel et al. | 136—86 |
| 3,154,682 | 10/64 | Hartz et al. | 250—44 |

WINSTON A. DOUGLAS, *Primary Examiner.*